(12) United States Patent
Kim et al.

(10) Patent No.: US 7,715,502 B2
(45) Date of Patent: May 11, 2010

(54) DIGITAL LOW-POWER CMOS PULSE GENERATOR FOR ULTRA-WIDEBAND SYSTEMS

(75) Inventors: Hyunseok Kim, Daejeon (KR); Youngjoong Joo, Chandler, AZ (US)

(73) Assignee: Arizona Board of Regents, Tempe, AZ (US)

( * ) Notice: Subject to any disclaimer, the term of this patent is extended or adjusted under 35 U.S.C. 154(b) by 780 days.

(21) Appl. No.: 11/517,075

(22) Filed: Sep. 7, 2006

(65) Prior Publication Data

US 2007/0098044 A1    May 3, 2007

Related U.S. Application Data

(60) Provisional application No. 60/714,709, filed on Sep. 7, 2005.

(51) Int. Cl.
*H03D 1/00* (2006.01)
*H04L 27/06* (2006.01)

(52) U.S. Cl. .................. 375/340; 375/146; 375/295; 375/346; 375/286; 375/138; 455/63.1; 342/21; 342/28

(58) Field of Classification Search .............. 455/73; 375/130, 295, 146, 340, 138, 346, 286; 342/28, 342/21
See application file for complete search history.

(56) References Cited

U.S. PATENT DOCUMENTS

| | | | | |
|---|---|---|---|---|
| 7,280,607 B2 * | 10/2007 | McCorkle et al. | ........... | 375/295 |
| 7,394,866 B2 * | 7/2008 | McCorkle | ........... | 375/295 |
| 7,397,841 B2 * | 7/2008 | Suzuki | ........... | 375/147 |
| 7,397,870 B2 * | 7/2008 | Batra et al. | ........... | 375/340 |
| 7,428,258 B2 * | 9/2008 | Fullerton et al. | ........... | 375/130 |
| 7,496,128 B2 * | 2/2009 | Giannakis et al. | ........... | 375/138 |
| 7,532,668 B2 * | 5/2009 | Suzuki | ........... | 375/239 |
| 2005/0213635 A1 * | 9/2005 | Terada et al. | ........... | 375/130 |
| 2006/0188001 A1 * | 8/2006 | Mo et al. | ........... | 375/130 |
| 2009/0080493 A1 * | 3/2009 | Krishnan et al. | ........... | 375/130 |

OTHER PUBLICATIONS

Parr et al., "A Novel Ultra-Wideband Pulse Design Algorithm," IEEE Communications Letters, vol. 7, No. 5, May 2003.

Gerrits et al., "Wavelet Generation Circuit for UWB Impulse Radio Applications," Electronics Letters Dec. 5, 2002, vol. 38, No. 25.

Sheng et al., "On the Spectral and Power Requirements for Ultra-Wideband Transmission," 2003 IEEE.

Kim et al., "All-Digital Low-Power CMOS Pulse Generator for UWB System," Electronics Letters Nov. 25, 2004, vol. 40, No. 24.

(Continued)

*Primary Examiner*—Marceau Milord
(74) *Attorney, Agent, or Firm*—Schwabe Williamson & Wyatt

(57) ABSTRACT

A low-power pulse generator is provided for use in ultra-wideband (UWB) systems. In one embodiment, the UWB pulse generator includes four pulse generators, such as digital triangular pulse generators, that generate Gaussian-like pulses of alternating polarity at different time offsets. The resulting four Gaussian-like pulses are combined to generate a UWB pulse that approximates the fifth derivative of a Gaussian pulse. In other embodiments, different-order derivatives of a Gaussian pulse may be approximated by combining different numbers of Gaussian-like pulses. The UWB pulse generator is preferably implemented with CMOS circuitry to limit power consumption.

20 Claims, 8 Drawing Sheets

OTHER PUBLICATIONS

Win et al, "Impulse Radio: How it Works," IEEE Communications Letters, vol. 2, No. 2, Feb. 1998.

"New Public Safety Applications and Broadband Internet Access Among Uses Envisioned by FCC Authorization of Ultra-Wideband Technology," NEWS Federal Communications Commission, Feb. 14, 2002.

Stoica et al., "An Ultra Wideband TAG Circuit Transceiver Architecture," Centre for Wireless Communications, University of Oulu P.O. Box 4500, FIN 90014 University of Oulu, Finland, Publication Date: May 18-21, 2004, Posted online: Aug. 16, 2004, 6 pages.

Bagga et al., "A PPM Gaussian Monocycle Transmitter for Ultra-Wideband Communications," Electronics Research Laboratory Faculty of Electrical Engineering, Mathematics and Computer Science (EEMCS), Delft University of Technology, Delft, the Netherlands, Publication Date: May 18-21, 2004, Posted online: Aug. 16, 2004, 8 pages.

Kim et al., "Design of CMOS Scholtz's Monocycle Pulse Generator," Dept. of Electrical Engineering, Arizona State University, Publication Date: Nov. 16-19, 2003, Posted online: Mar. 3, 2004, 6 pages.

"Revision of Part 15 of the Commission's Rules Regarding Ultra-Wideband Transmission Systems," Federal Communications Commission, ET Docket No. 98-153, Adopted: Feb. 14, 2002, Released on Apr. 22, 2002, 118 pages.

* cited by examiner

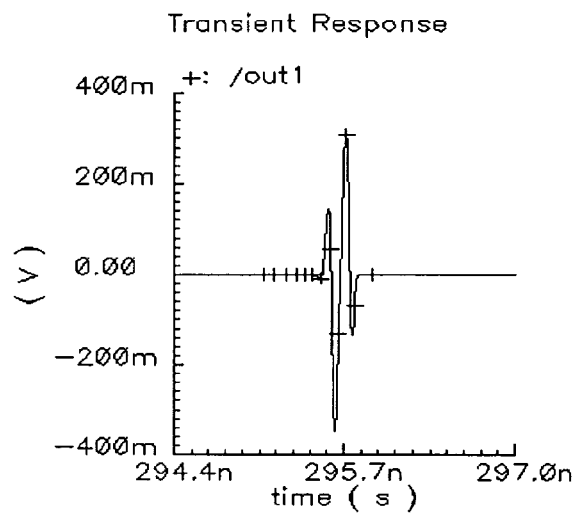 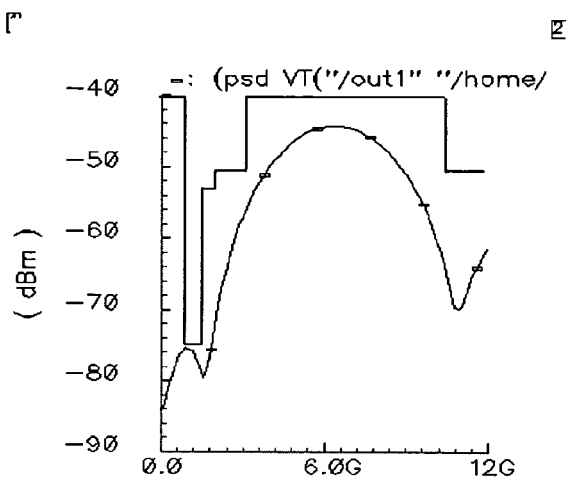
FIG. 3A    FIG. 3B
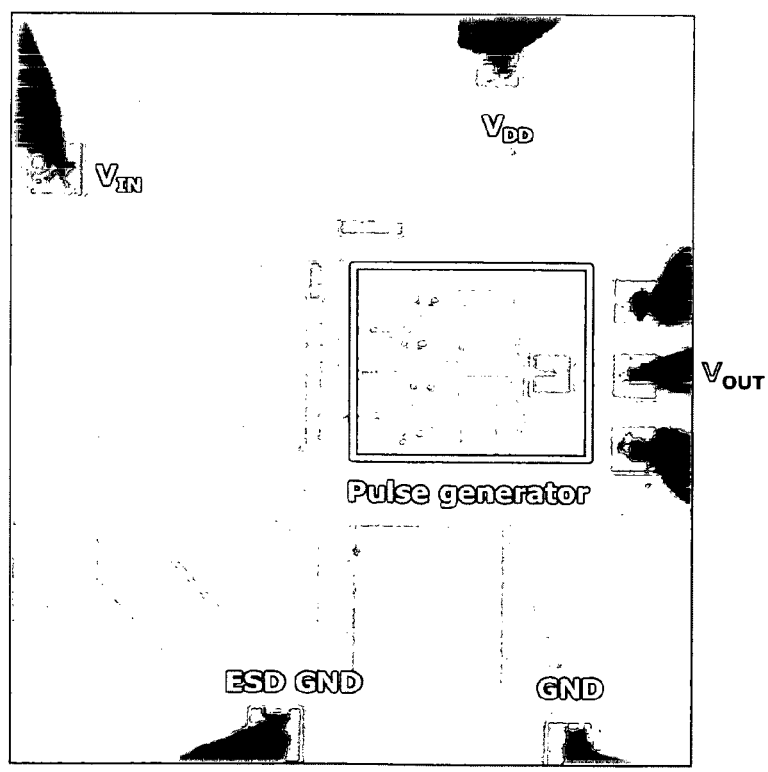
FIG. 4

DIGITAL LOW-POWER CMOS PULSE GENERATOR FOR ULTRA-WIDEBAND SYSTEMS

CROSS-REFERENCE TO RELATED APPLICATION

This is a nonprovisional application claiming priority to U.S. Provisional Patent Application No. 60/714,709, filed Sep. 7, 2005, the specification of which is incorporated herein by reference.

BACKGROUND

This invention relates to ultra-wide bandwidth circuits and systems and in particular to a low power CMOS pulse generator device for use in ultra-side bandwidth circuits and systems.

In ultra-wideband (hereinafter referred to as "UWB") applications, such as communication systems, radar applications, and radio frequency identification tagging, ultra-short pulses are used for transmitting an information signal. UWB applications are emerging as a useful way to provide high speed, low power communications with resistance to multipath interference. Advantages of UWB systems over conventional radio frequency (hereinafter referred to as "RF") systems in appropriate applications include low power consumption and simple architecture, as described by Win and Scholtz in IEEE Commun. Lett. Vol 2, No. 2, pp 10-12 (1998), and incorporated herein by reference. UWB signals generally consist of a train of extremely narrow pulses, often on the order of 0.2-2.0 nanoseconds. Because the pulse width is short compared to the pulse period, UWB signals occupy a broad communication band at low power levels.

Federal Communications Commission (hereinafter referred to as "FCC") regulations for UWB technology require that transmitted UWB pulses should observe strict limitations in terms of a pulse bandwidth and amplitude. The emissions of radio frequency devices generally are regulated by Part 15 of Title 47 of the Code of Federal Regulations ("C.F.R."). Subpart F, in particular, entitled "Ultra-Wideband Operation," and found at 47 C.F.R. §§15.501-15.525, recites regulations that specifically restrict the emissions of UWB devices. Among those regulations, the FCC sets forth frequency masks for UWB devices in particular applications, namely "ground penetrating radars and wall imaging systems" (§15.509); "through-wall imaging systems" (§15.510); "surveillance systems" (§15.511); "medical imaging systems" (§15.513); "vehicular radar systems" (§15.515); "indoor UWB systems" (§15.517); and "hand held UWB systems" (§15.519). These frequency masks are incorporated herein by reference. Further limitations and measurement requirements are set forth in §15.519, "Technical requirements applicable to all UWB devices," also incorporated herein by reference.

Given the tight regulations of UWB devices, designing a simple and low power UWB pulse generator that can meet FCC limits is challenging. The first or second derivative of a Gaussian pulse is generally used for a UWB pulse, because it is easily expressed by a mathematical form. Several methods have been proposed to generate these signals using integrated circuits, and are described by Stoica et al., in Proc. 2004 IEEE Conf. on Ultra Wideband Systems and Tech, pp 258-262 (2004), by Bagga et al., in Proc. 2004 IEEE Conf. on Ultra Wideband Systems and Tech, pp 130-134 (2004), by Gerrits et al., in IEE Electron. Lett., Vol. 38, No. 25, pp 1737-1738 (2002), and by Kim et al., in Proc. 2003 IEEE Conf. on Ultra Wideband Systems and Tech, pp 258-262 (2003), all of these articles being incorporated herein by reference. A disadvantage of these pulse generators is that the output signals generated must further be filtered in order to satisfy FCC regulations. Furthermore, many of these previous approaches consume constant powers for biasing.

Considering the various FCC-imposed frequency masks, the fifth derivative of the Gaussian pulse is in some ways more effective as single UWB pulse than the first or second derivative of the Gaussian, as described by Sheng et al., in Conf. Rec. 2003 IEEE Int. Conf. Communications, pp. 738-743 (2004), incorporated herein by reference. The spectrum of this pulse is close to maximally occupied under the FCC limitation floor, and this pulse can be transmitted without any extra filtering. However, although the fifth-derivative of a Gaussian pulse can be implemented with complicated digital signal processing circuits, such circuits typically consume too much power, which can make these circuits unsuitable for low power applications such as radio frequency identification tagging, as described by Carr et al., in IEEE Commun. Lett., Vol 7, No. 5, pp 219-221 (2003) and incorporated herein by reference, and other applications where power consumption is a concern.

It is generally desirable to design pulse generators with a simple and power efficient architecture, preferably without the need to use additional filtering to meet FCC specifications. It would be advantageous, therefore, to remedy the foregoing and other deficiencies inherent in the prior art.

SUMMARY

A low-power pulse generator is provided for use in UWB systems. In one embodiment, the UWB pulse generator includes four Gaussian-like pulse generators that generate pulses at different time offsets. The resulting four Gaussian-like pulses are combined to generate a UWB pulse that approximates the fifth derivative of a Gaussian pulse.

In another embodiment, an ultra-wideband pulse generator includes a sequence control stage, a pulse generation stage, and an output stage. The sequence control stage receives a pulse enable signal and generates output signals with different time offsets at a plurality of output branches. The pulse generation stage includes a plurality of pulse generators, wherein each pulse generator is coupled to an output branch of the sequence control stage and generates a Gaussian-like pulse at its respective time offset. The output stage combines the generated pulses into an ultra-wideband pulse. Preferably, the pulses are timed in such a way as to approximate a derivative of first or higher order of the Gaussian pulse. In a preferred embodiment, four Gaussian-like pulses are combined to approximate the fifth derivative of the Gaussian pulse.

Preferred embodiments of the invention presented here are described below in the Brief Description of the Drawings and in the Detailed Description. Unless specifically noted, it is intended that the words and phrases in the specification and the claims be given the ordinary and accustomed meaning to those of ordinary skill in the applicable arts. If any other special meaning is intended for any word or phrase, the specification will clearly state and define the special meaning. In particular, most words have a generic meaning. If it is intended to limit or otherwise narrow the generic meaning, specific descriptive adjectives will be used to do so. Absent the use of special adjectives, it is intended that the terms in this specification and claims be given their broadest possible, generic meaning.

Likewise, the use of the words "function" or "means" in the Detailed Description is not intended to indicate a desire to invoke the special provisions of 35 U.S.C. 112, Paragraph 6, to define the invention. To the contrary, if it is intended to invoke the provisions of 35 U.S.C. 112, Paragraph 6, to define the inventions, the claims will specifically recite the phrases "means for" or "step for" and a function, without also reciting in such phrases any structure, material or act in support of the function. Even when the claims recite a "means for" or "step for" performing a function, if they also recite any structure, material or acts in support of that means or step, then the intention is not to provoke the provisions of 35 U.S.C. 112, Paragraph 6. Moreover, even if the provisions of 35 U.S.C. 112, Paragraph 6 are invoked to define the inventions, it is intended that the inventions not be limited only to the specific structure, material or acts that are described in the preferred embodiments, but in addition, include any and all structures, materials or acts that perform the claimed function, along with any and all known or later-developed equivalent structures, materials or acts for performing the claimed function.

BRIEF DESCRIPTION OF THE DRAWINGS

Referring to the drawings:

FIG. 3A is a graph showing sumulation results of the pulse shape of a pulse generator designed;

FIG. 3B is a graph showing simulated power spectral density of a pulse generator;

FIG. 4 is an image illustrating the visual appearance of a pulse generator circuit;

DETAILED DESCRIPTION

A. Properties of the Fifth-Derivative of the Gaussian Pulse

Low power pulse generator circuits for UWB systems are described herein. In one embodiment, the pulse generator is a complementary metal oxide semiconductor (hereinafter referred to "CMOS") pulse generator designed to generate four pulses. The individual pulse shape has an approximately Gaussian-like pulse or triangular pulse shape. The combined output pulse shape is similar to the fifth derivative of a Gaussian pulse which complies with FCC emission limits.

Figure 1A:
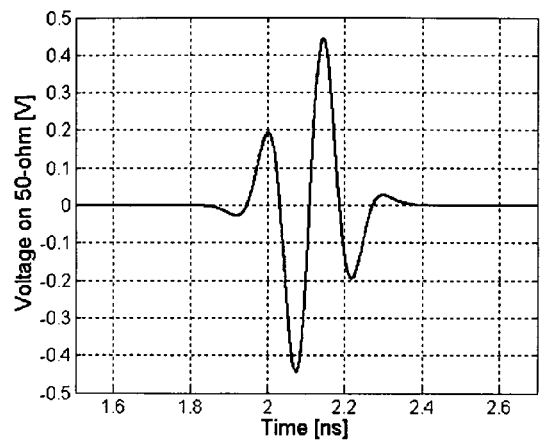
FIG. 1A is a graph showing a pulse shape of the fifth derivative of a Gaussian Pulse.
Figure 1B:
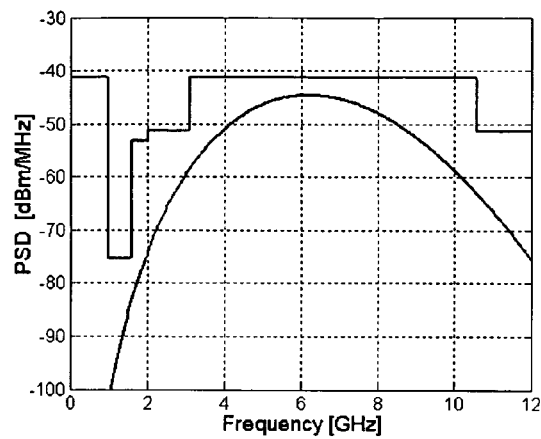
FIG. 1B a graph showing a power spectral density of the fifth derivative of a Gaussian Pulse.

The fifth-derivative of a Gaussian pulse is represented by the equation, $$f(t) = A \cdot \left( -\frac{t^5}{\sqrt{2\pi}\,\sigma^{11}} + \frac{10 t^3}{\sqrt{2\pi}\,\sigma^9} - \frac{15 t}{\sqrt{2\pi}\,\sigma^7} \right) \cdot \exp\left( -\frac{t^2}{2\sigma^2} \right) \quad (1)$$

where f(t) is a function representing the pulse output, t represents time and A and σ are variables which are chosen to fit the pulse f(t) to FCC limits. For this pulse shape, FIG. 1A shows the transient response in the time domain and FIG. 1B shows the corresponding power spectral density (hereinafter referred to as "PSD") in the frequency domain, illustrated together with a UWB frequency mask. As seen in FIG. 1B, the PSD of the Gaussian fifth derivative occupies a substantial portion of the spectrum available under the UWB frequency mask.

As is visible from the waveform illustrated in FIG. 1A, the fifth derivative of an ideal Gaussian pulse has five finite roots (or zero-crossings)—a consequence of the fifth-order polynomial of equation (1)—and two roots at infinity. The fifth derivative of a Gaussian pulse further has six local extrema, or peaks: three positive and three negative. In general, the $N^{th}$ derivative of an ideal Gaussian pulse has N finite roots and N+1 peaks. For example, the Gaussian pulse is its own $0^{th}$ derivative, and it has no finite roots and one peak.

A Gaussian pulse may be processed using an analog differentiator to generate the fifth-derivative of the Gaussian pulse. However, this procedure requires many analog and digital circuit stages and therefore is not suited for low power transceiver design.

To implement or approximate the above-described function, or another function that meets FCC regulations, with a power-efficient architecture, alternative approaches are required.

B. Description of Applicable Frequency Masks

For the purposes of example, the frequency mask illustrated herein is based on the FCC frequency mask for indoor "indoor UWB systems," which limits a device's equivalent isotropically radiated power, or "EIRP," defined in the regulations as "the product of the power supplied to the antenna and the antenna gain in a given direction relative to an isotropic antenna." 47 C.F.R. §15.503(c). This frequency mask, as set forth in 47 C.F.R. §15.517(c), is summarized in Table 1, below.

TABLE 1

| Frequency in MHz | EIRP in dBm |
|---|---|
| 960-1610 | −75.3 |
| 1610-1990 | −53.3 |
| 1990-3100 | −51.3 |
| 3100-10600 | −41.3 |
| Above 10600 | −51.3 |

It should be understood that this particular frequency mask summarizes only one of many FCC regulations that either directly or indirectly restrict the operation of UWB devices, and that skilled practitioners of the art would, in designing a UWB device, take other applicable regulations into consideration, including, but not limited to, any other applicable radiated emissions limits.

Although in a preferred embodiment a UWB device described herein is designed to comply with the frequency mask of Table 1 for indoor UWB systems, other devices prepared according to the present specification may be designed to comply with different UWB frequency masks, whether they be frequency masks corresponding to other UWB applications set forth in Subpart F of the FCC regulations, such as hand held applications, or masks corresponding to not-yet-developed UWB applications. It is further understood that regulations concerning UWB applications may change over time and may vary among different jurisdictions, and it is contemplated that the UWB devices disclosed herein are not limited to UWB applications set forth in the current FCC regulations.

C. Efficient Generation of a Gaussian Fifth Derivative Pulse

As can be seen from FIG. 1A, the fifth derivative of a Gaussian pulse includes six peaks. The four central peaks-those with extrema ranging between approximately 2.0 and 2.2 ns—have prominent amplitudes compared with the two found at approximately 1.9 and 2.3 n. Each of the four central peaks itself has a generally Gaussian shape.

Figure 1C:
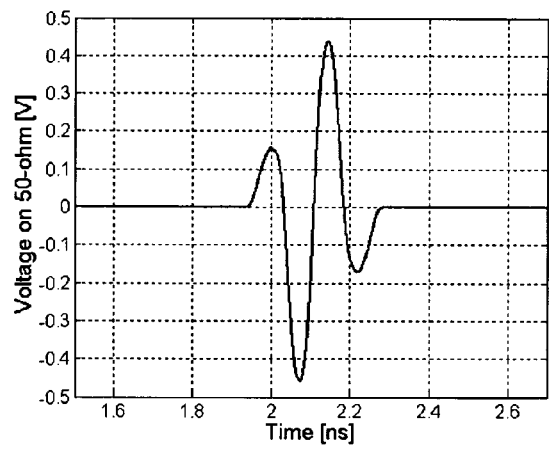
FIG. 1C is a graph showing a pulse shape of an approximation of a fifth derivative of a Gaussian Pulse.
Figure 1D:
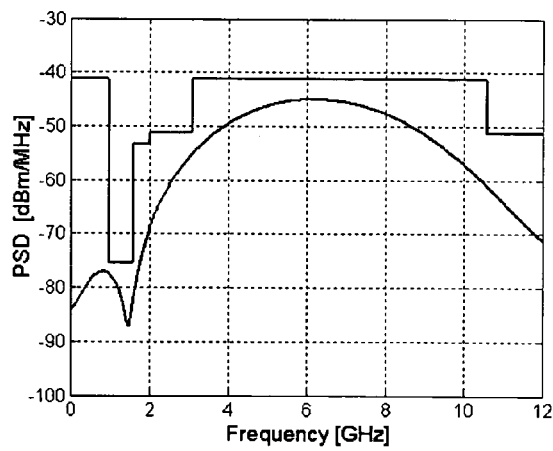
FIG. 1D is a graph showing a power spectral density of an approximation of a fifth derivative of a Gaussian Pulse.

To generate a pulse that approximates the shape of the Gaussian fifth derivative, four consecutive Gaussian-like pulses are consecutively combined with predetermined delay times and alternating polarities to generate a new pulse shape as shown in FIG. 1C. Each of the four constituent Gaussian-like pulses can be designed with different coefficients of width and amplitude, such that their combination approximates the Gaussian fifth derivative. The resulting waveform, as seen in FIG. 1C, differs from the ideal Gaussian fifth derivative in that it has only three finite roots and two roots at infinity. However, as illustrated in FIG. 1D, the main envelope of the PSD, centering around approximately 6 GHz and spanning from approximately 3 GHz to 10 GHz, is similar to the PSD of the ideal Gaussian fifth derivative. Like the ideal Gaussian fifth derivative, the approximated Gaussian fifth derivative of FIGS. 1C and 1D occupies a substantial portion of the spectrum available below the frequency mask. Therefore, it is possible to generate an FCC-compliant UWB pulse by combining four consecutive Gaussian-like pulses.

It should be noted that the term "Gaussian-like pulse," as used herein, is not limited to a waveform that strictly follows the equation of the Gaussian distribution. Instead, as would be understood by those skilled in the art, a Gaussian-like pulse may be a practical approximation to a strictly Gaussian waveform including but not limited to, a Lorentzian, triangle or square pulse. In accordance with—and not in place of—the understanding of those in the art, a Gaussian-like pulse is generally characterized as having a prominent primary peak whose amplitude dominates over any secondary peaks, while the amplitude of the pulse generally diminishes with increased separation from the primary peak. Similarly, it should further be understood that pulses characterized as "triangle" or "square" pulses are not expected, in practical applications, to take precisely the forms from which they are named, but may instead take on various trapezoidal or rounded characteristics or may display artifacts from technical limitations in their generation, such as attenuation of high-frequency components. It is further to be expected that triangle, square, and other Gaussian-like pulses will demonstrate at least some temporal asymmetry due to, among other causes, residual capacitance and inductance of the electronic components used to implement the pulse generator and to convey and combine any generated pulses.

A Gaussian-like pulse may itself be formed by combining other pulses, which may be, but need not be, Gaussian-like pulses themselves. For example, two or more Gaussian-like pulses generated in sufficient temporal proximity to one another and combined with like polarity can themselves form a single Gaussian-like pulse with a greater pulse width and greater amplitude than the original pulses. Superimposing two or more Gaussian-like pulses that are separated with little or no temporal difference and that have different amplitudes and/or polarities can be used as a technique of varying the pulse amplitude with little or no change in the pulse width.

D. Generalization to Higher Derivatives of the Gaussian Pulse

Pulse shapes other than a fifth order derivative of Gaussian pulse that meet FCC requirements can also be generated in UWB devices as described herein. In consequence, the discussion of a fifth derivative of a Gaussian pulse should be understood as a preferred but not limiting embodiment.

In light of the observations of Section A, above, the $N^{th}$ derivative of a Gaussian pulse may be approximated by combining a series of N+1 or fewer Gaussian pulses of alternating polarities. In particular, it has been observed, as discussed in Section C, above, that although the ideal $N^{th}$ derivative includes N+1 peaks, the PSD of the $N^{th}$ derivative can be approximated with the combination of fewer than N+1 Gaussian-like pulses. In a preferred embodiment, the number of Gaussian-like pulses used to approximate the $N^{th}$ derivative is N−1, such that, as discussed in Section C, the fifth derivative is approximated by combining four Gaussian-like pulses.

As illustrated by Sheng et al., in Conf. Rec. 2003 IEEE Int. Conf. Communications, pp. 738-743 (2004), higher-order derivatives of the Gaussian generally result in a narrower PSD. In consequence, a particular Gaussian derivative may be selected as the best fit for a targeted UWB frequency mask, and a pulse generator may be designed to approximate that selected derivative by using a combination of Gaussian-like pulses as described herein. If, for example, the $N^{th}$ derivative of the Gaussian provides a PSD that is an acceptable fit for the appropriate frequency mask, then a circuit that generates a series of up to N+1 Gaussian-like peaks with alternating polarities may be designed and simulated to approximate the selected Gaussian $N^{th}$ derivative. The PSD of the simulated circuit may then be compared with the frequency mask to determine an appropriate fit.

While the use of N−1 pulses in a simulated circuit may be advantageous as a starting point for simulation, the number of pulses may be reduced further if simulation and/or actual measurements indicate that the resulting PSD will fit under the frequency mask, as the use of fewer pulses can simplify the resulting circuit. Preferably, at least two Gaussian-like pulse generators are used to generate at least two pulses of opposite polarity, thereby approximating at least a first derivative of the Gaussian pulse. A series of Gaussian-like pulses approximates the $N^{th}$ derivative of a Gaussian pulse when the relative timing and relative amplitudes of the most prominent peaks in the series of Gaussian-like pulses corresponds to the relative timing and relative amplitude of the Gaussian $N^{th}$ derivative.

E. An Exemplary UWB Pulse Generator

Figure 2:
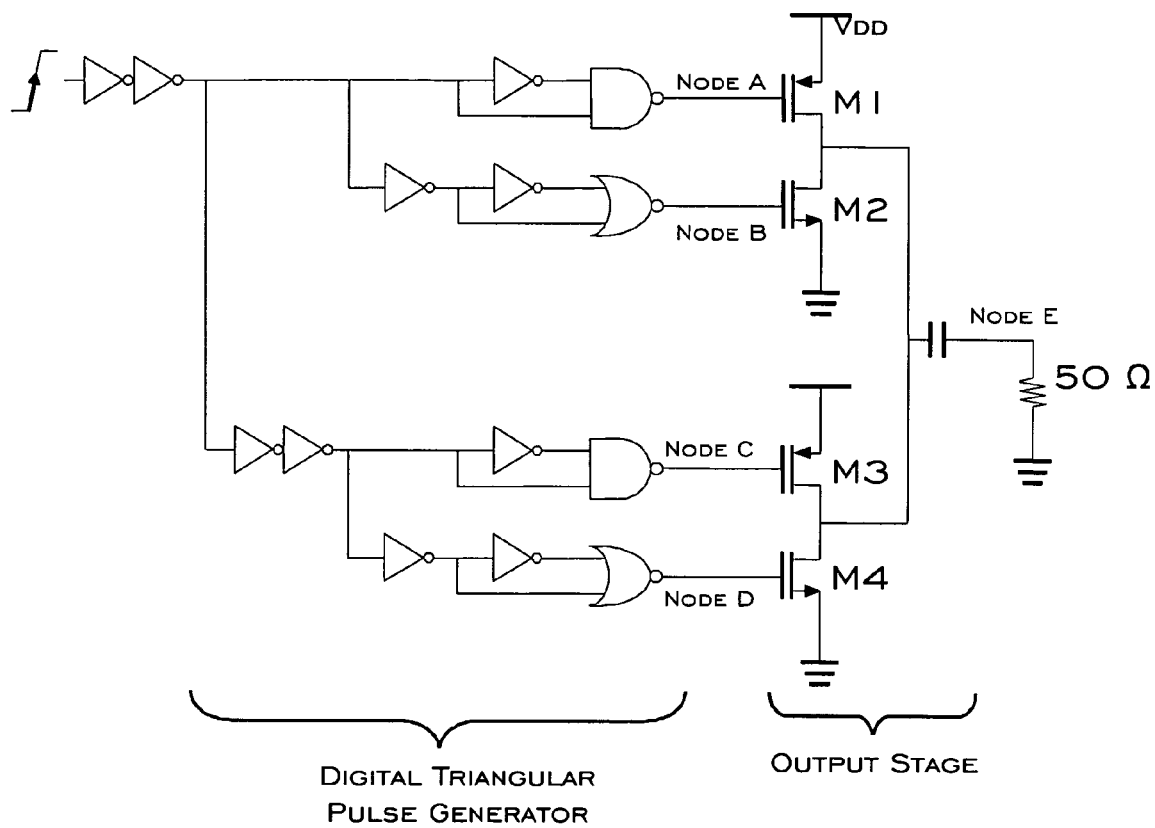
FIG. 2 is a schematic of a circuit design of a pulse generator.

FIG. 2 is a circuit diagram of a pulse generator. The pulse generator generates an approximated fifth-derivative Gaussian pulse as described by Kim et al., in IEE Electron. Lett., 40(24), pp. 1534-1535, 2004, and herein incorporated by reference. The circuit includes a pulse generator stage and an output stage. In the embodiment of FIG. 2, the pulse generator is a digital triangular pulse generator and the output stage is designed to drive a 50 ohm load. However, it will be understood that other digital pulse generators can also be used that generate other shapes such as Lorentzian shaped pulses and the like. It will also be understood that the output stage can be designed to drive a different impedance load.

In the digital triangular pulse generator stage, a Gaussian-like triangular pulse is generated at each of the nodes A, B, C, and D, and the output stage combine four consecutive outputs from the digital triangular pulse generators. At nodes A and C, a triangle pulse is generated by a circuit consisting of a NAND gate and a corresponding inverter, while at nodes B and D, the triangle pulse is generated by a circuit consisting of a NOR gate and a corresponding inverter. Each of the triangular pulse generator circuits is triggered through a sequence control stage comprising a series of inverters. A pulse enable signal propagating through the sequence control stage passes through a different number of inverters for different branches of the sequence control stage. As each inverter delays the signal propagation by a known amount, the inverters determine the relative time at which each triangular pulse generator circuit receives an input and, thus, the delay time at which it generates its respective pulse.

Since the NAND gate is low when both inputs are high, and NOR gate is high when both inputs are low, the outputs of NAND and NOR gates become low and high within a very short time period, respectively. As shown in FIG. 2, four digital triangular pulse generators carry out the above procedures with pre-determined delay time, where the delay time at which each pulse is generated is determined by the number and properties of inverters disposed between the input and each respective NAND or NOR gate.

The voltage variations on nodes A and C follow the negative-peak triangular pulse shape from a power rail voltage, denoted $V_{DD}$ to the ground, and voltage variations on nodes B and D are the positive-peak triangular pulse shape from the ground to $V_{DD}$. The NOR gate generates positive-peak triangular pulse, and the negative-peak triangular pulse is constructed with NAND gate. In a preferred embodiment, each triangular pulse is designed to have the same peak-to-peak amplitude. To organize four successive signals correctly, different size and number of inverter blocks are used to control the delay times.

It will be understood that a pulse generator such as a digital triangular pulse generator can be designed using different circuits and approaches, including other types of digital logic circuits or analog circuits.

Four triangular pulses generated in the previous block successively enter the output stage. The output current magnitude is controlled by the size of output transistor (M1-M4). The node voltage in front of the capacitor should be kept in consideration, because it may affect the operating region of the output transistors. In general, only one of the MOS transistors in the output stage is turned on at any one time, so that the static power consumption is minimized. Additionally, a bi-phase pulse can be easily implemented by changing the order of phase, as will be described shortly.

Pulse generator of FIG. 2 has been simulated with standard 0.18-μm CMOS technology using Spectre, a circuit simulation tool. The results of the simulation are illustrated in FIGS. 3A and 3B. FIG. 3A shows the pulse waveform, illustrating that the simulated output pulse width is 380 ps. The PSD of the pulse is illustrated in FIG. 3B and is seen to be in compliance with the FCC frequency mask.

F. Implementation of the Exemplary UWB Pulse Generator Circuit

A circuit designed in accordance with the present invention has been fabricated and tested using a standard 0.5 μm CMOS process, where the dimension 0.5 μm relates to a feature size of the CMOS process. Fabrication using a 0.5 μm CMOS process is used for purposes of illustration only. It will be understood that other CMOS processes exist with other feature sizes and processing capabilities, such as a 0.18 μm CMOS process, a 0.11 μm CMOS process, or the like, and that circuits can be fabricated using these processes. FIG. 4 illustrates the appearance of a UWB pulse generator fabricated using a 0.5 μm CMOS process.

Figure 5A:
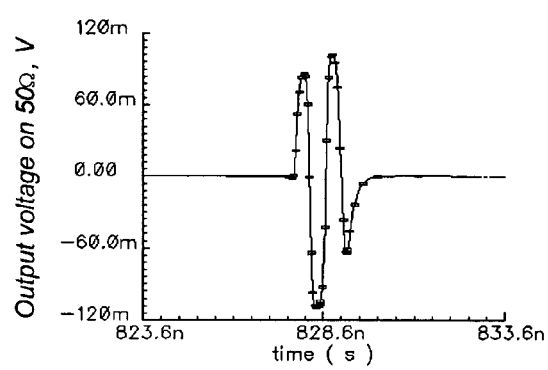
FIG. 5A is a graph showing a simulation of a pulse shape.
Figure 5B:
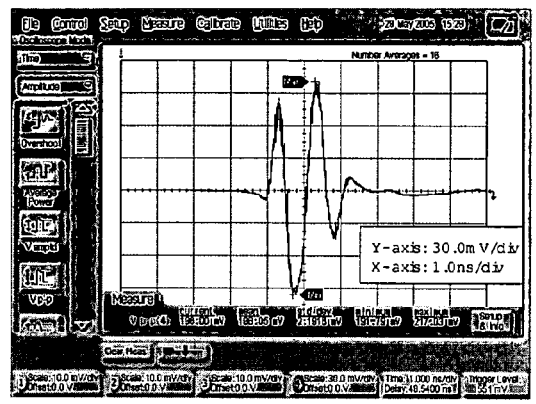
FIG. 5B is a graph showing a generated pulse shape.

As shown in FIG. 5A, the simulated pulse width for a circuit fabricated using a 0.5 μm process is 1.947 ns and the peak-to-peak amplitude is 211.12 mV. FIG. 5B shows the output pulse for the circuit shown in FIG. 4, measured using an Agilent Infiniium DCA 86100A wide-bandwidth oscilloscope. The pulse width is 2.1 ns and peak-to-peak amplitude is 198.0 mV, in close agreement with the simulation result. The average power consumption is 85 μW at a pulse repetition frequency (hereinafter referred to as "PRF") of 1 MHz. Since the proposed pulse generator is designed with digital circuitry, average power consumption is proportional to PRF. The measured data indicates that all-digital UWB pulse generators are suitable for low-cost, low-power UWB transmitter design.

Figure 6:
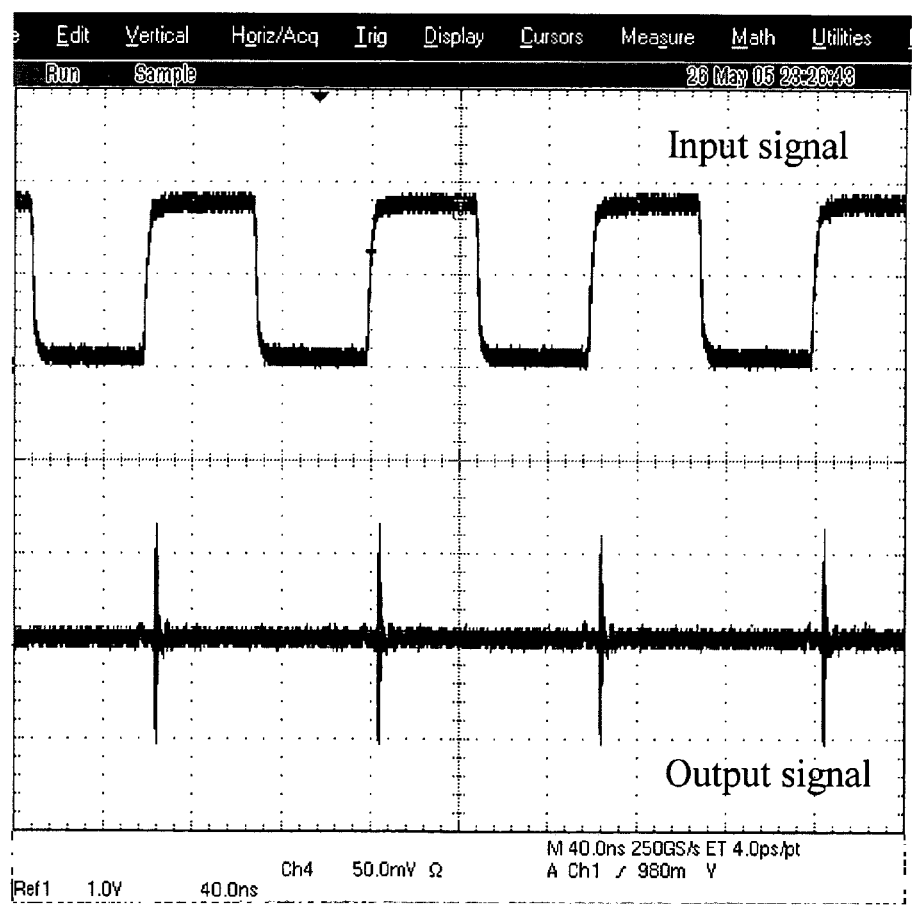
FIG. 6 is a graph showing a synchronized output pulse with a 10 MHz input signal.

FIG. 6 shows the output pulse synchronized with a digital input signal which is operated with a PRF of 10 MHz. When an input pulse is applied with a PRF of 20 MHz, 10 MHz, and 1 MHz, average power consumption values are 1.715 mW, 860 μW, and 85 μW, respectively. The average power consumption is proportional to PRF.

G. An Exemplary Bi-Phase UWB Pulse Generator with Amplitude Control

In another embodiment, a UWB pulse generation circuit can include two additional features. First, the circuit can be modified to generate a bi-phase signal which has the same shape but opposite phase. Second, output pulse amplitude can be controlled. With the same pulse amplitude, a lower PRF reduces PSD. With the same PRF, an increased pulse amplitude increases PSD. Since the amplitude of UWB pulse directly influences PSD, which represents average power emission as described in Revision of Part 15 the Commission's rules regarding ultra-wideband transmission systems: FCC, ET Docket 98-153, 2002, and incorporated herein by reference, UWB pulse amplitude is preferably controlled for effective PSD control, although amplitude does not have to be controlled.

Figure 7:
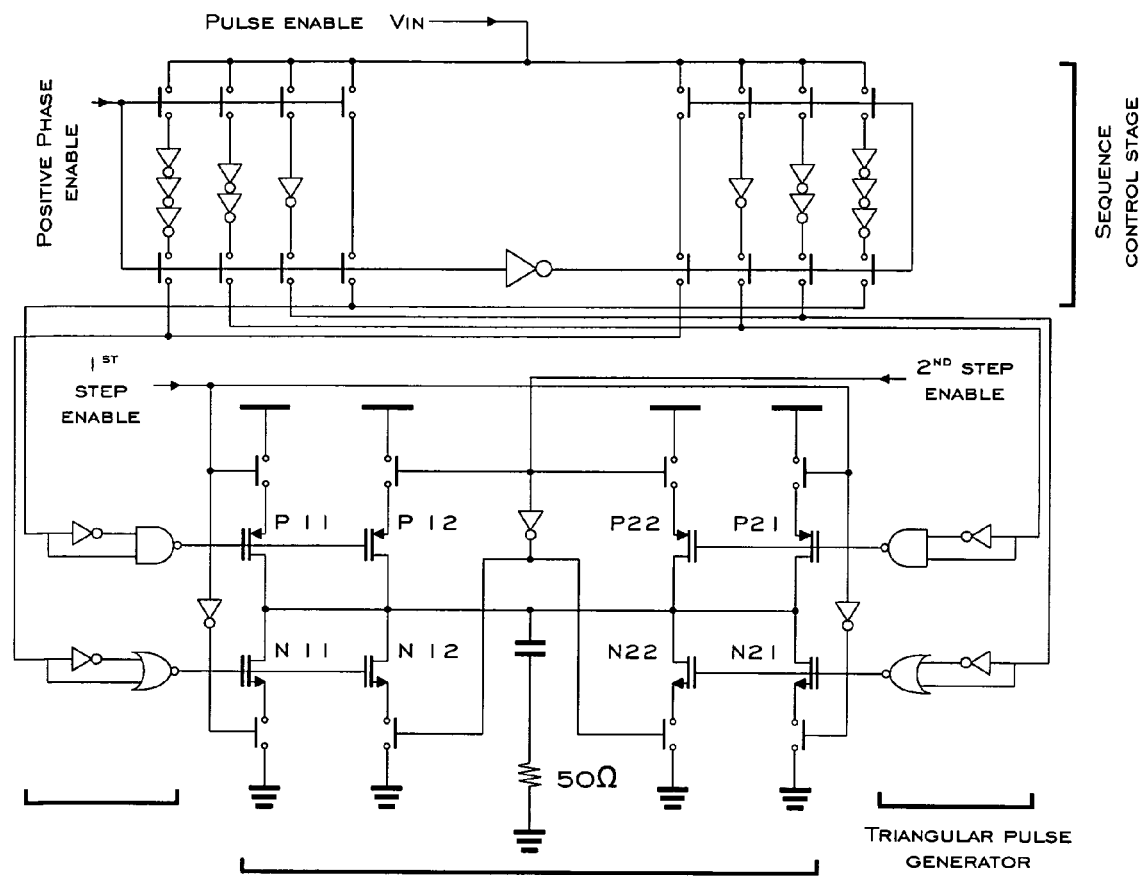
FIG. 7 is a schematic of a circuit design of another pulse generator.

A simplified schematic of a circuit incorporating the above two features is shown in FIG. 7. When a pulse enable signal, denoted $V_{IN}$ is high, the pulse generator is activated. At the first stage, a pulse enable signal is entered into a sequence control stage. In this stage, the pulse enable signal is divided into four branches where each branch is composed of inverter strings. Since the number of inverter strings is different in each branch, four pulse enable signals have different delay times. Thus, the sequence control stage controls time delay to arrange four subsidiary pulses. Then four signals are transferred to digital triangular pulse generators. As in the example of FIG. 2, each digital triangular pulse generator is composed of either a NAND or a NOR gate together with a corresponding inverter. Based on a logic status of NAND or NOR gates, triangular pulses are generated in each logic output stage. The outputs of digital triangular pulse generator have the same amplitude, but polarities are different due to the characteristics of NAND and NOR gates.

Four triangular pulses from the NAND and NOR gates flow into an output stage. Each triangle pulse generator is connected to two output MOS transistors in the output stage. The MOS transistors, P11, N11, P12, N12, P21, N21, P22, and N22, combine the outputs of the triangle pulse generators. After four output pulses are combined at the output stage, the approximated fifth derivative of a Gaussian pulse is delivered into a 50Ω output termination resistor.

To produce a bi-phase pulse, the order of four branches in sequence control stage has to be arranged in accordance with each phase. As shown in FIG. 7, sequence control stage is extended into two parts. The left side is for the positive phase and the right side is for the negative phase. The order of inverter strings is different and leads to two opposite phases. Switches which are located on ahead and behind of inverter strings are used to choose each phase. The transmission gate consisting of NMOS and PMOS is used to operate as a switch.

The output amplitudes of the final UWB pulse are decided by the sizes of MOS transistors in output stage. If the size of output transistor can be regulated, an amplitude of a UWB pulse can be controlled. After the maximum amplitude which is available to be generated is decided, it is divided into reasonable step sizes or increments. Each transistor is a controlled MOS switch with the same size as output transistor. As shown in FIG. 7, MOS switches in output stage play a role in selecting output transistors which are connected to NAND and NOR gates.

In one embodiment, three different amplitudes are generated. They are distinguished by $1^{st}$ and $2^{nd}$ enable signals. It will be understood that more than two enable signals can be used to generate more than three different amplitudes, but two enable signals with three different pulse amplitudes is described by way of example only, and is not intended to limit the scope of the invention. In a system with two enable signals, the largest amplitude is generated when both signals are enabled. The bi-phase UWB pulse generator is designed and simulated with standard 0.18-μm CMOS technology. However, it can also be implemented using other CMOS technologies, as previously discussed.

H. Simulation of the Bi-Phase UWB Pulse Generator with Amplitude Control

Figure 8:
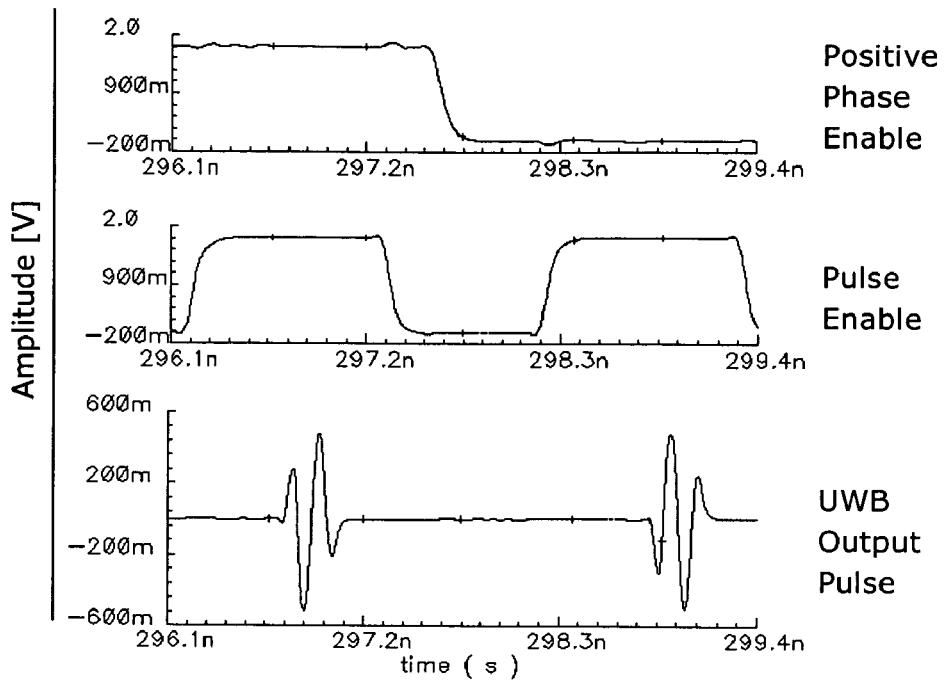
FIG. 8 is a graph showing simulation results of a pulse with bi-phase modulation.

FIG. 8 shows the simulation result of the bi-phase UWB pulses generator of FIG. 7. The UWB pulse is generated and synchronized by an edge of a pulse enable signal. In one embodiment, a rising edge of a pulse signal enable is used. As shown in FIG. 7, the phase of the UWB pulse is controlled by positive phase enable signal. After the positive phase enable signal changes, the UWB pulse is generated with the same amplitude but opposite phase.

Figure 9:
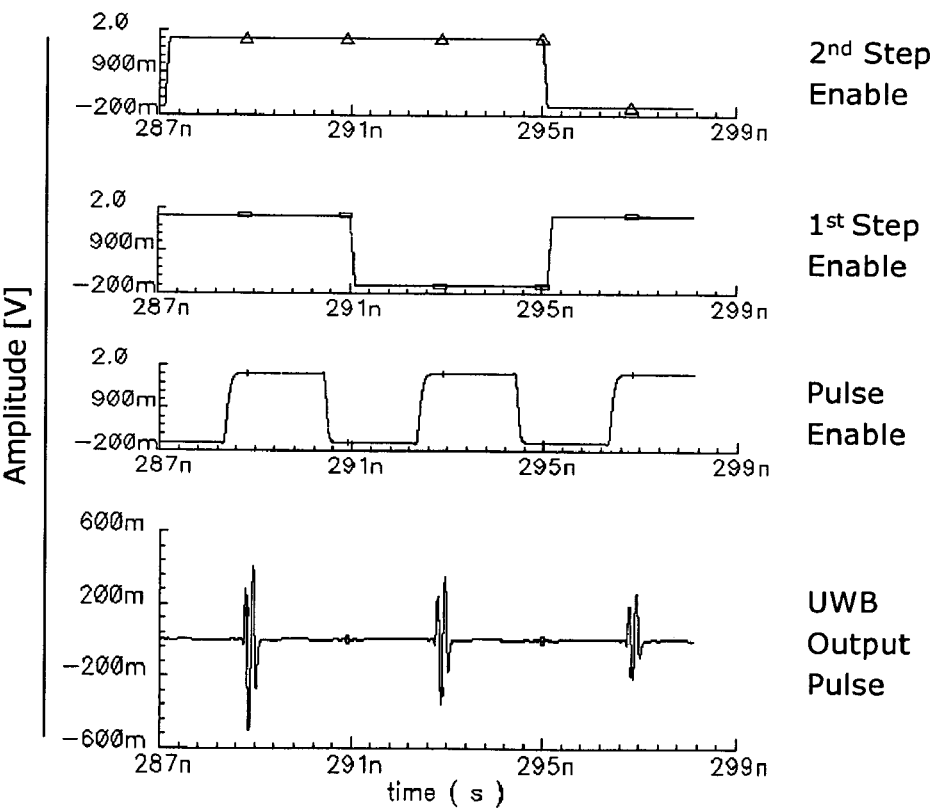
FIG. 9 is a graph showing simulation results of a pulse with different amplitudes.

Three distinguished UWB pulses are generated as shown in FIG. 9. They are distinguished by $1^{st}$ and $2^{nd}$ step enable signals. The former is worked for lowest amplitude and the latter is operated for medium amplitude. The highest amplitude is intentionally designed to sum value of outputs in the $1^{st}$ and $2^{nd}$ step. Each MOSFET switch forms 2-digital binary weighted array and are digitally selected. Peak-to-peak voltage swings are 924-mV, 665-mV, and 402-mV on 50-Ω output termination resistor.

The pulse generator shown schematically in FIG. 7 consumes very low power. Only digital circuits are used, and the connection between VDD and GND exists only when a UWB pulse is generated in output stage. Thus power consumption of the proposed pulse generator is proportionally reduced with decreased PRF.

Figure 10:
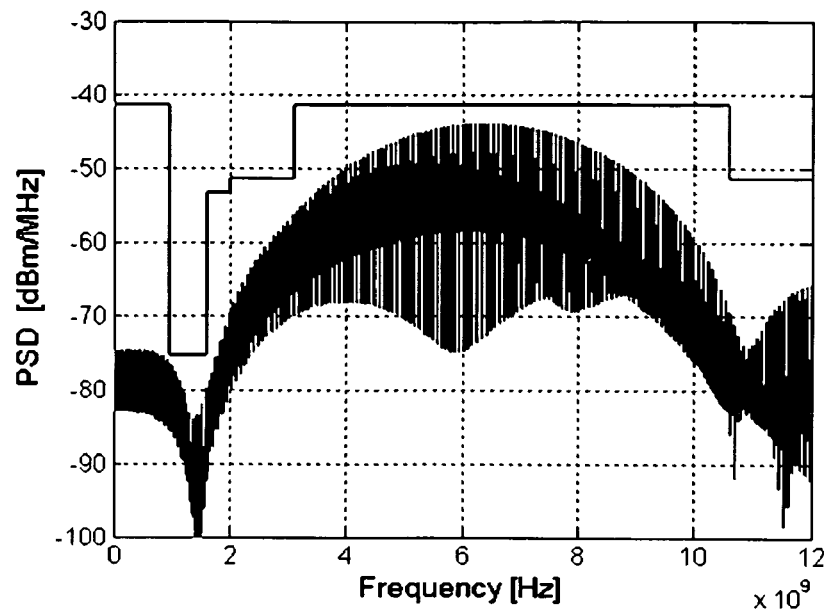
FIG. 10 is a graph showing a simulation of a power spectral density of pulses.

The highest amplitude is used to simulate PSD, although other amplitudes can also be used. As shown in FIG. 10, using a PRF of 77 MHz as an example PRF, the UWB pulse which is generated with bi-phase modulation and the highest amplitude complies with the FCC frequency mask. Total power consumption is 1.88-mW for a 1.8V supply voltage. When the lowest amplitude is used, the power consumption is 807.6 μW. This power consumption is proportionally decreased when PRF is decreased.

I. Implementing a Bi-Phase UWB Pulse Generator with Amplitude Control

Figure 11:
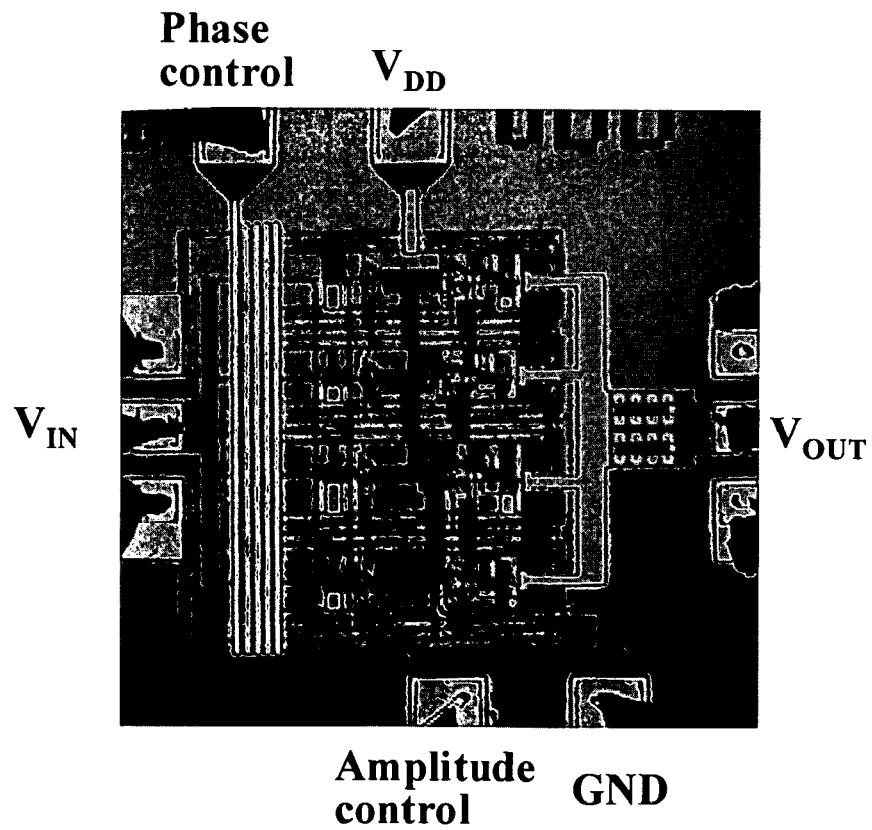
FIG. 11 is an image illustrating the visual appearance of another pulse generator circuit.
Figure 12:
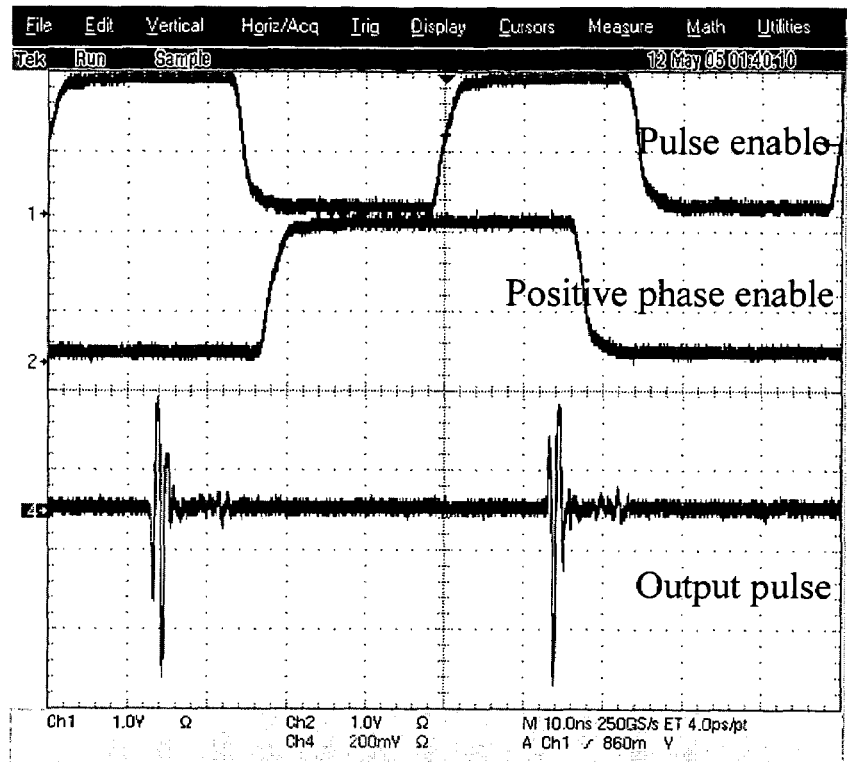
FIG. 12 is a graph showing bi-phase modulation of the pulse generator shown in FIG. 11.
Figure 13:
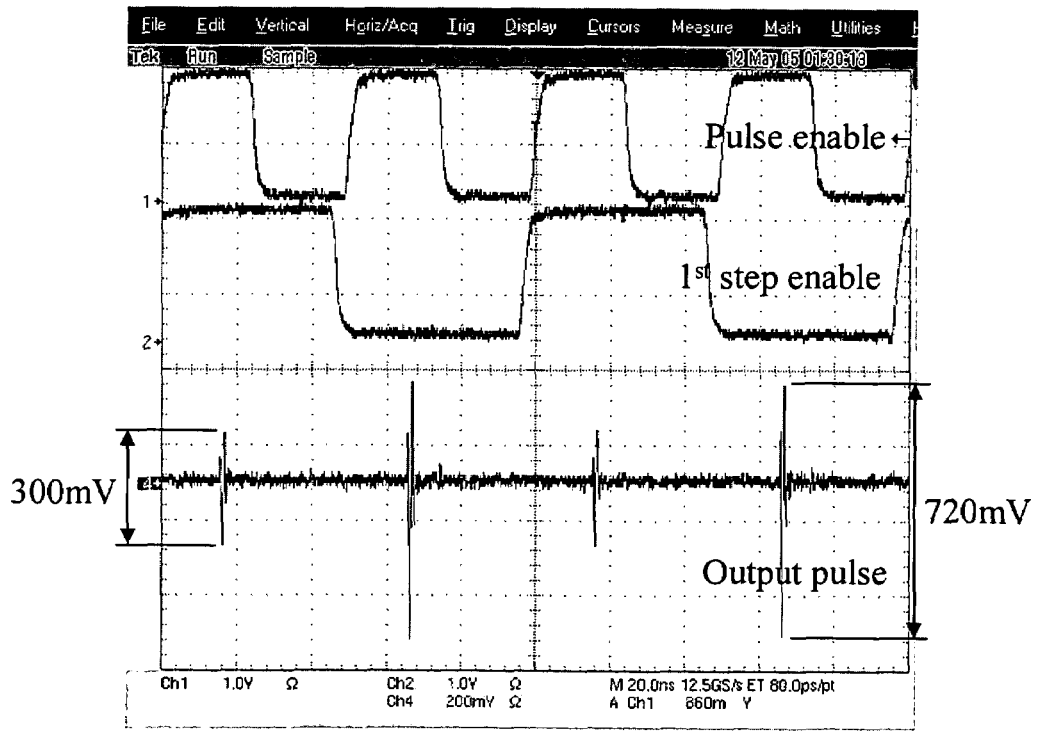
FIG. 13 is a graph showing amplitude control of the pulse generator shown in FIG. 11.

FIG. 11 illustrates the appearance of another pulse generator circuit formed in accordance with the present invention, corresponding to the schematic design shown in FIG. 7. FIG. 12, analogous to the simulated FIG. 8 of the simulation, shows bi-phase modulation from this circuit. FIG. 13, analogous to FIG. 9 of the simulation, shows amplitude control from the circuit.

Fine tuning circuits can also be incorporated into circuit designs. A purpose of a fine tuning circuit is to provide control of a pulse width. Yet another purpose of a fine tuning circuit is to provide control of a pulse delay time. Fine tuning circuits can be used to account for mismatch between simulation and test results, which can arise from non-perfect circuit modeling as well as errors introduced during fabrication.

Although specific embodiments have been illustrated and described herein, it will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present invention includes any other applications in which embodiment of the above structures and fabrication methods are used. The scope of the embodiments of the present invention should be determined with reference to claims associated with these embodiments, along with the full scope of equivalents to which such claims are entitled.

The invention claimed is:

1. A system, comprising: a sequence control stage including a pulse enable input node and a plurality of output branches, wherein the sequence control stage is operative, in response to receiving a pulse enable signal at the pulse enable input node, to provide signals at the plurality of output branches at a plurality of time offsets; a pulse generation stage including at least two pulse generators, wherein each pulse generator has an input node coupled to a respective output branch of the sequence control stage, and wherein each pulse generator is operative to generate at an output node a Gaussian-like pulse in response to a signal from the respective output branch of the sequence control stage; and an output stage comprising a plurality of transistors and coupled to the output nodes of the Gaussian-like pulse generators and operative to combine the Gaussian-like pulses into an ultra-wideband pulse, wherein the ultra-wideband pulse approximates an Nth derivative of a Gaussian distribution, where N>0.

2. The system of claim 1, wherein the sequence control stage is comprised of a plurality of inverters and wherein each output branch is operatively coupled to the pulse enable input node via a different number of inverters.

3. The system of claim 1, wherein the at least two pulse generators are digital triangular pulse generators.

4. The system of claim 3, wherein at least one of the digital triangular pulse generators comprises a NAND gate coupled to an inverter.

5. The system of claim 3, wherein at least one of the digital triangular pulse generators comprises a NOR gate coupled to an inverter.

6. The system of claim 1, wherein the pulse generation stage includes four pulse generators, and wherein the four pulse generators are operative to generate consecutively four Gaussian-like pulses of alternating polarity.

7. The system of claim 1, wherein the output stage comprises, for each pulse generator, a MOS transistor coupled to the output node of the respective pulse generator.

8. The system of claim 1, wherein the output stage comprises, for each pulse generator, a first and a second MOS transistor coupled to the output node of the respective pulse generator, wherein each of the first MOS transistors is coupled to a first enable node, and wherein each of the second MOS transistors is coupled to a second enable node.

9. The system of claim 1, wherein the sequence control stage comprises a first set of output branches, a second set of output branches, and a phase enable input node operative to select between the first and second set of output branches.

10. A method of generating an ultra-wideband pulse, the method comprising:
generating, by a first pulse generator, a first Gaussian-like pulse having a first polarity;
at a time offset after the first pulse, generating, by a second pulse generator, a second Gaussian-like pulse at a second polarity opposite the first polarity; and combining, by an output stage, comprising a plurality of transistors, at least the first and second pulses into an ultra-wideband pulse, wherein the ultra-wideband pulse approximates an Nth derivative of a Gaussian distribution, where N>0.

11. The method of claim 10, further comprising:
at a time offset after the second pulse, generating a third Gaussian-like pulse having the polarity of the first pulse;
at a time offset after the third pulse, generating a fourth Gaussian-like pulse having the polarity of the second pulse; and
combining the first, second, third, and fourth pulses into an ultra-wideband pulse that approximates a fifth derivative of the Gaussian pulse.

12. The method of claim 11, wherein the total number of Gaussian-like pulses combined into the ultra-wideband pulse is equal to N+1.

13. The method of claim 10, wherein N>1.

14. The method of claim 10, wherein the total number of Gaussian-like pulses combined into the ultra-wideband pulse is equal to N−1.

15. The method of claim 14, wherein N=5 and the total number of Gaussian-like pulses combined into the ultra-wideband pulse is equal to 4.

16. The method of claim 10, wherein at least one of the first and second Gaussian-like pulses is a triangular pulse.

17. An ultra-wideband pulse generator comprising: a first pulse generator operative to generate, at a first time, a first Gaussian-like pulse having a first width and first amplitude;
a second pulse generator operative to generate, at a second time after the first time, a Gaussian-like pulse having a second width and second amplitude; and an output stage comprising a plurality of transistors and operative to combine the first and second Gaussian-like pulses to generate an ultra-wideband pulse; wherein the first and second width and the first and second time are selected such that the ultra-wideband pulse approximates an Nth derivative of a Gaussian distribution, where N>0.

18. The ultra-wideband pulse generator of claim 17, further comprising:
a third pulse generator operative to generate, at a third time after the second time, a third Gaussian-like pulse having a third width and third amplitude; and
a fourth pulse generator operative to generate, at a fourth time after the third time, a Gaussian-like pulse having a fourth width and fourth amplitude;
wherein the output stage is further operative to combine the first, second, third, and fourth Gaussian-like pulses to generate an ultra-wideband pulse.

19. The ultra-wideband pulse generator of claim 18, wherein N=5, and wherein the first, second, third, and fourth widths are substantially the same, and the first, second, third, and fourth amplitudes are substantially the same.

20. The ultra-wideband pulse generator of claim 18, wherein:
the first and third pulse generators each comprise an inverter and a NAND gate; and
the second and fourth pulse generators each comprise an inverter an a NOR gate.

* * * * *